United States Patent
Sama

(10) Patent No.: US 8,966,591 B2
(45) Date of Patent: Feb. 24, 2015

(54) ADAPTIVE STRIKE COUNT POLICY

(71) Applicant: CA, Inc., Islandia, NY (US)

(72) Inventor: VenkataBabji Sama, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/745,198

(22) Filed: Jan. 18, 2013

(65) Prior Publication Data

US 2014/0208386 A1    Jul. 24, 2014

(51) Int. Cl.
*H04L 29/06*    (2006.01)
*G06F 21/00*    (2013.01)

(52) U.S. Cl.
CPC .............. *H04L 63/08* (2013.01); *H04L 63/14* (2013.01)
USPC ............................................. 726/4; 707/784

(58) Field of Classification Search
CPC ......... G06F 21/33; G06F 21/41; G06F 21/31; G06F 2221/2101; G06F 2221/2105; G06F 2221/2119; H04L 63/0435; H04L 63/083; H04L 9/3226; H04L 63/123; H04L 2209/56; H04L 63/1441; H04L 9/32; H04L 63/10; Y10S 707/99936; Y10S 707/99931
USPC .............. 726/4–7, 27–29; 707/600–831, 217, 707/219, 225, 229; 713/182, 168
See application file for complete search history.

(56) References Cited

U.S. PATENT DOCUMENTS

| | | | |
|---|---|---|---|
| 6,412,070 B1 | 6/2002 | Van Dyke et al. | |
| 7,047,560 B2 | 5/2006 | Fishman et al. | |
| 7,373,516 B2 * | 5/2008 | Ashok et al. | 713/183 |
| 7,934,253 B2 | 4/2011 | Overcash et al. | |
| 8,046,827 B2 * | 10/2011 | Corella | 726/6 |
| 2002/0067832 A1 * | 6/2002 | Jablon | 380/277 |
| 2007/0143626 A1 | 6/2007 | Okuda | |

* cited by examiner

*Primary Examiner* — Saleh Najjar
*Assistant Examiner* — Shu Chun Gao
(74) *Attorney, Agent, or Firm* — Myers Bigel Sibley & Sajovec, P.A.

(57) ABSTRACT

An adaptive strike count management is implemented for securing resources. The method authorizes access to a resource if a security credential matches pre-stored security data. However, when the security credential does not match the pre-stored security data, the adaptive strike count management method denies access to the resource; assesses the risk level based on the security credential; increments a strike counter by a predetermined value based on the risk level; and disables further access attempts to the resource if the strike counter exceeds a threshold. The strike counter is incremented by a first value when the risk level is assessed to be a first level, a second value when the risk level is assessed to be a second level, and a third value when the risk level is assessed to be a third level.

17 Claims, 3 Drawing Sheets

ADAPTIVE STRIKE COUNT POLICY

BACKGROUND

The present disclosure relates generally to authentication systems. More specifically, the present disclosure relates to an adaptive strike count policy based on risk determination.

Typical authentication systems face significant challenge with attacks such as Dictionary attack and Brute-force attack, Guess Attack, etc., where an intruder, e.g., computer hacker, is attempting to guess somebody else's password. To mitigate such attacks, authentication systems implement a policy of placing a limit on the number of unsuccessful authentication attempts beyond which the account would get locked, and remain unusable until the account is reactivated. This is known as Strike Count Policy.

Once an account is locked, reactivation of the account would happen either automatically after certain period of time (e.g., 24 Hrs), or after completion of additional authentication. Regardless of the reactivation method employed, the conventional Strike Count Policy causes an inconvenience to the user of the account.

Moreover such policy would easily enable a computer hacker to launch Denial Of Service (DoS) attacks on the account. Merely by purposefully entering a threshold number of incorrect passwords, a computer hacker can prevent access to the account by its rightful owner, especially in the case where reactivation is based on an elapsed period of time.

BRIEF SUMMARY

According to some embodiments of the present disclosure, a security credential is received and compared to a pre-stored security data securing a resource. Access to the resource is authorized when the security credential matches the security data. When the security credential does not match the security data, access to the resource is denied, the risk level is assessed based on the security credential, a strike counter is incremented by a predetermined value based on the risk level, and further access attempts to the resource are disabled when the strike counter satisfies a threshold. The strike counter is incremented by a first value when the risk level is assessed to be a first level, a second value when the risk level is assessed to be a second level, and a third value when the risk level is assessed to be a third level.

In various aspects, a risk level is determined by analyzing a passcode securing the resource, user behavior at previous access occurrences, machine information identifying a machine typically used to access the resource, physical location of typical access occurrences, and/or access frequency.

In some aspects, the risk level is determined to be the first level when the security credential matches a previous security data. In other aspects, the risk level is determined to be the second level when access is attempted from a device different from a device previously used to successfully access the resource.

In some aspects, the strike counter is incremented by a third value when the risk level is determined to be a third level, the third value being different than the first and second values. The risk level may be determined to be the third level when a latency between multiple unsuccessful access attempts is less than a predetermined latency threshold. The risk level may also be determined to be the third level when the access is attempted from a blacklisted location.

In another aspect, access attempts to the resource are reenabled after a time duration. The time duration may be based on the risk level. The time duration may be different for the second level than for the first level or third level.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Not every wrong password attempt is equally risky. So, every wrong attempt should not result in an equal strike count increment. In the present disclosure, each attempt is given an appropriate risk weighting that is directly proportional to the risk. The risk involved with each attempt can be evaluated based on several factors, e.g., the location from which the attempt is being made (high risk if the location is a block listed), the machine—assuming machine information is available, the risk is higher if the machine is not the same as the one the user typically uses, frequency, and elapsed time between the attempts.

An aspect of the present disclosure is implemented on a server configured to secure resources such as files and directories. The server may be a web server accessible over the Internet. Alternatively, the server may be a file server accessible over an intranet.

Figure 1:
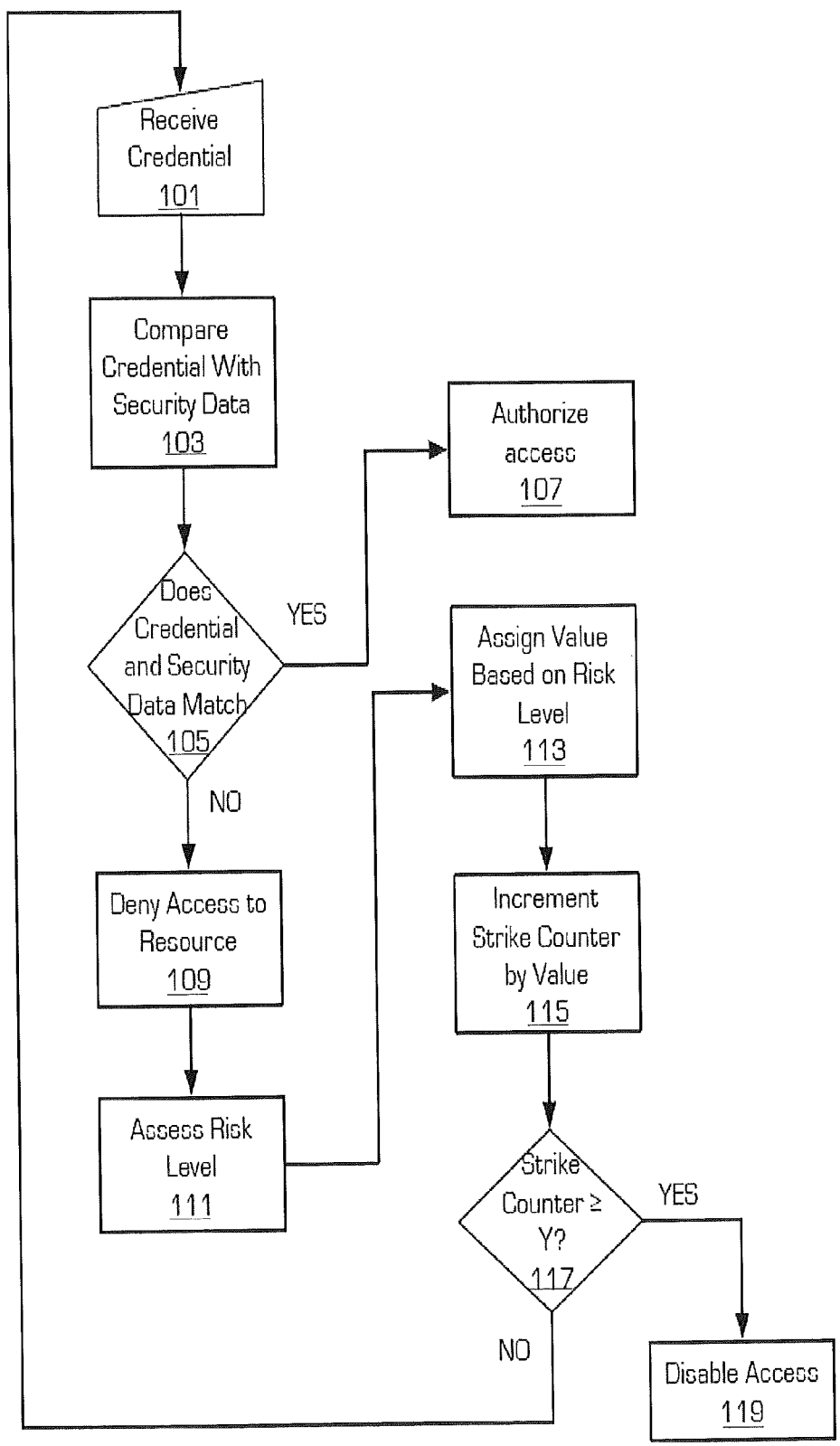
FIG. 1 illustrates a flow diagram of the process for performing an aspect of the present disclosure.

Referring to FIG. 1, an aspect of the disclosure, implemented on a server begins with the reception of a security credential, for example a password, in block 101. The received security credential is compared with a stored security data in block 103. If in block 105 the security credential and the security data are a match, the process proceeds to block 107 where access to the requested resource is granted. However, if the security credential and the security data do not match, the process proceeds to block 109.

In block 109, access to the requested resource is denied. Additionally, the process determines the risk level posed by the access attempt in block 111. In other words, the process analyzes characteristics of the security credential, sometimes against the security data. For example, the process can determine if the mismatch between the security credential and the security data is a result of a typographical error, which is considered minimal risk. Alternatively, the process may determine that the attempt to access the resource is an elevated risk if the access attempt originates from a computer that is not the typical computer used by the authorized user.

Further, if multiple access attempts are made in a short period of time, i.e., low latency between access attempts, the process may determine that the access attempt may pose a serious risk.

The security data can include a stored passcode securing the resource, user behavior at previous access occurrences, machine information identifying a terminal typically used to access the resource, physical location of typical access occurrences, or access frequency (latency). Any relevant information regarding the access attempt may be used to determine the risk level posed by the attempt.

Once the risk level of the access attempt is determined, the process assigns a value based on the risk level in block 113. For example, a low risk level may be assigned a value of 1, an elevated risk level may be assigned a value of 5, and a serious risk level may be assigned a value of 10. A strike counter is incremented by the value assigned to the access attempt in block 115. If the strike counter satisfies a threshold (Y) (e.g., is equal to or exceeds the threshold) in block 117, the process disables any further attempts to access the resource in block 119. Alternatively, if the strike counter does not satisfy the threshold (Y) (e.g., is less than the threshold) the process returns to block 101 and allows a further access attempt.

As evident from the flow diagram shown in FIG. 1, an aspect of the present disclosure is a strike counter that is incremented by a variable amount tied to the risk level of the access attempt. The variable incrementing allows more opportunities to attempt access when the security credential provided is deemed to be of minimal risk, while preventing too many opportunities when the risk level is elevated or serious.

Generally, minimal risk is understood in the context of the present disclosure as deriving from legitimate attempts to access the resource. For example, a misspelled password is low risk in that an authorized user is very likely to have made the error when typing. Moreover, other circumstances that may be considered low risk may be usage of an immediate previous password, when the password has been recently changed. Often an authorized user may have mistakenly forgotten that the password has been changed, and thus inputs the previous password.

Elevated risks may indicate suspicious activity indicative of an unauthorized access attempt. Such elevated risks may be usage of an atypical computer system, or access from an atypical location. For example, if the authorized user generally accesses the resource by way of a mobile device or using a particular web browser, deviation from this usage in combination with a non-matching password entry may well indicate that the attempt is not originating from an authorized user. Similarly, if the authorized user generally accesses the resource from the United States, any attempt originating from a non-U.S. location may be indicative of a hacking attempt.

Serious risks are strongly suggestive of a malicious access attempt. Such serious risks may be determined based on the frequency with which each successive attempt is made, as well as the consistency of the elapsed time between attempts. In other words, an unauthorized attempt to access the resource may be carried out using a computer program to systematically try numerous passwords until the correct one is found. Often such a computer program will make attempts with little pause between each attempt, thus the attempts have a high frequency or latency. Additionally, a computer program will generally require the same amount of time for each attempt thus the elapsed time between attempts will be highly similar.

The following table shows exemplar risks and corresponding risk values in accordance with the present disclosure. However, the table is not intended to be all encompassing of risks contemplated by the present disclosure, nor are the valuations intended to be more than examples. Thus, one of ordinary skill in the art will readily arrive at modifications and additions to the risks and adjust the risk values as appropriate for the specific application without deviating from the present disclosure.

TABLE 1

Risk criteria and valuations

| RISK CRITERIA | VALUE |
| --- | --- |
| Misspelling of password by less than 2 characters | 1 |
| Usage of password just prior to current password | 2 |
| Login attempted from atypical computer | 5 |
| Login attempted from atypical location | 5 |
| Login attempted at atypical time | 5 |
| Elapsed time between attempts consistent to within ±.01 sec | 10 |
| Frequency of multiple login attempts >5/minute | 15 |
| Login attempted from Blacklisted location | 100 |

The above descriptions provide a limited sampling of criteria that can be used in the present disclosure for determining the risk level of a failed access attempt. However, the present disclosure is not limited to only these exemplary criteria. One of ordinary skill in the art will readily identify other useful criteria on which to base a risk assessment of a failed access attempt.

Figure 2:
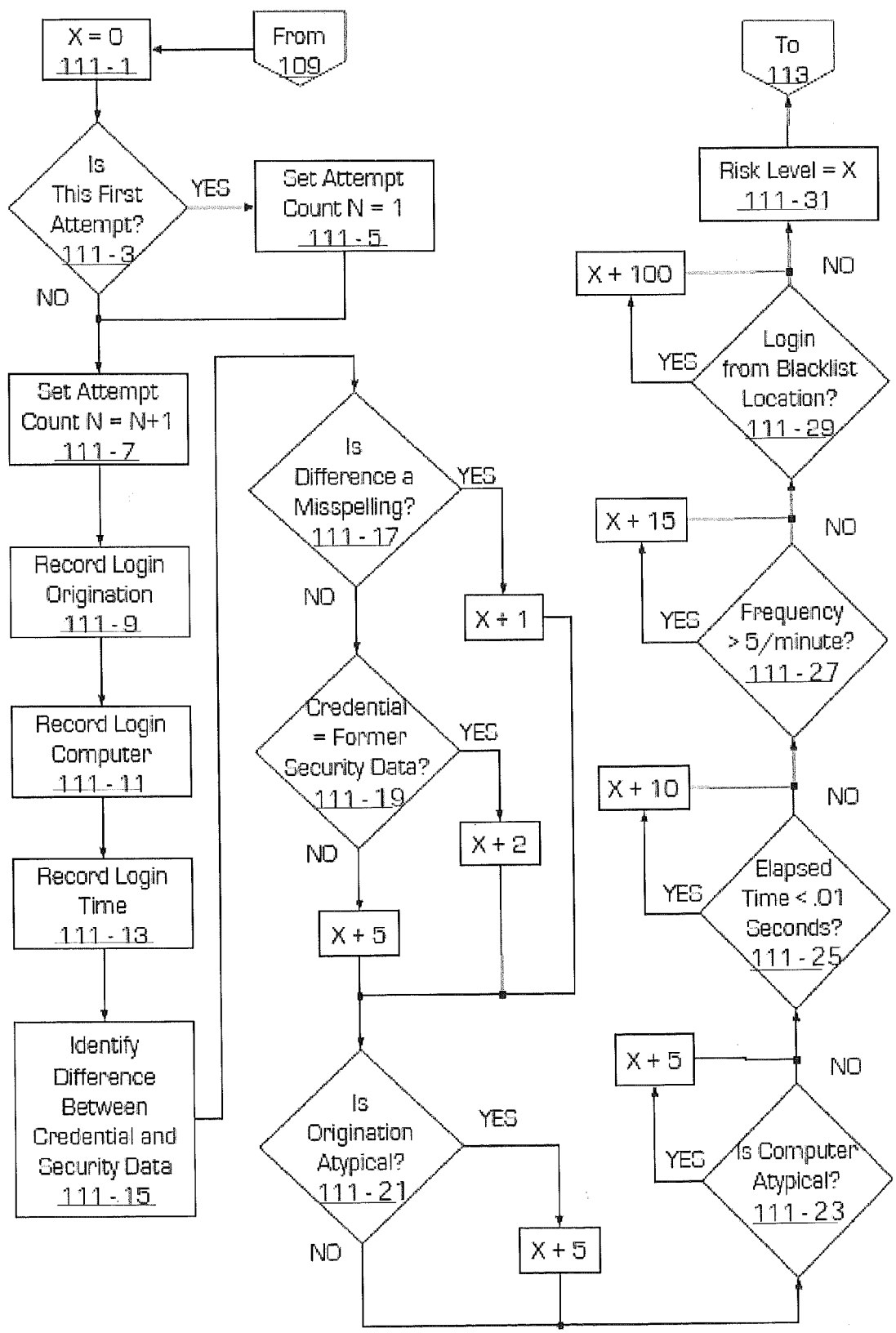
FIG. 2 illustrates a flow diagram of the sub-process performed by block 111 of the aspect shown in FIG. 1.

Referring to FIG. 2, a more detailed example process is shown relating to the procedures performed at block 111 of the aspect shown in FIG. 1. The process shown in FIG. 2 is initiated following block 109 of FIG. 1. The process initializes a counter (X=0) as the risk counter in block 111-1. If block 111-3 determines that the current access attempt is the first attempt, the process sets an attempt counter (N) equal to 1 in block 111-5. Otherwise the attempt counter (N) is incremented by 1 in block 111-7.

The process collects information regarding the present access attempt in blocks 111-9 through 111-15. The information collected includes, but is not limited to, the origination of the attempt (block 111-9), identifying information of the computer or mobile device used for the access attempt (block 111-11), the time of the access attempt (block 111-13), and the difference between the provided credential and the stored security data (block 111-15). This information, as well as other applicable information, is stored in a searchable database as user data to be used in the risk evaluation following.

Once the information is collected and stored, the process proceeds to block 111-17 where the process determines if the difference between the provided credential and the security data is a result of a misspelling. The determination of a misspelling versus an incorrect password may be determined based on whether more or less letters differ than a threshold number, for example two characters. Thus, if two characters or less differ between the credential and the security data then the process determines the failed access attempt to be the result of a misspelling and increment the risk counter (X) by one. If the credential is considered a misspelling, the process proceeds to block 111-21 once the risk counter (X) has been incremented. Otherwise, the process continues to block 111-19.

The process proceeds to block 111-19, where the credential is compared against previously set security data of the user. Often, a user may mistakenly use a previous credential because the previous credential had been used many more times than the new credential. This is especially true when the credential has been recently changed. Thus, at block 111-19 if the determination is made that the currently entered credential matches a credential previously set as the security data, the procedure increments the risk count (X) by two and proceeds to block 111-21. In some cases, the time duration since the last password reset may be considered as the likelihood of trying an old password after a password reset diminishes as time passes.

Alternatively, if either block 111-17 or block 111-19 results in a positive determination (YES) the process may be configured to proceed directly to block 111-31, thus bypassing the other evaluations of the credential discussed below.

On the other hand, if both blocks 111-17 and 111-19 result in a negative (NO) determinations, the process considers the credential to be an incorrect guess. Consequently, the process increments the risk counter (X) by a value of five and proceeds to block 111-21.

The process continues on to block 111-21 where the origination of the access attempt is analyzed. The analysis may be based on originating IP address, country of origin as determined by the route taken by the data packet over the Internet, whether the origination is from the institution's own intranet or from an external network, or other known techniques for determining general originating location of an internet packet. If the origination is determined to be atypical for the specific user, the process increments the risk counter (X) by a value of five, otherwise the process proceeds to block 111-23.

In block 111-23, the process determines if the computer or mobile device used to attempt access is a typical computer used by the user during successful access attempts in the past. For this determination, the present disclosure must maintain a log of computers and mobile devices used by the user to access the secured resources. This log may be part of the user database discussed above, or may be a separate database accessible by processes of the present disclosure. Additionally, the log entries for the user are compared with the current computer information obtained in block 111-11. Examples of identifying computer information may include the device MAC address, operating system version, device type, or any other information that is retrievable over a network. If the computer or mobile device is atypical for the user, the process increments the risk counter (X) by five. Otherwise, the process continues on to block 111-25.

At block 111-25, the process determines the elapsed time between multiple unsuccessful access attempts. In block 111-13, the time of the current access attempt was recorded. The recorded time for each access attempt can be compiled and elapsed time between each attempt calculated in block 111-25. If the elapsed time between multiple attempts differs by less than a predetermined threshold, for example 0.01 seconds, the present disclosure determines that the attempts may originate from an automated hacking program. A determination of a short elapsed time results in incrementing the risk counter (X) by ten. This block may be skipped when the attempt counter (N) equals one.

The process continues onto block 111-27 where the process calculates the frequency of the access attempts. The frequency is calculated based on the number of attempts made within a predetermined time, for example number of attempts within a minute. As with the elapsed time determination, a high frequency of attempts is an indication of an automated hacking attempt. Thus, a frequency above the predetermined threshold frequency results in the risk counter (X) being incremented by fifteen. As with block 111-25, this block may be skipped when the attempt counter (N) equals one.

At block 111-29, the process determines whether the access attempt originates from a blacklisted location. A blacklisted location may be as specific as an IP address or as general as an entire country. A failed access attempt from a blacklisted location may not be provided with a second attempt, as such an access attempt is most likely the result of a hacking attempt and thus poses a serious security threat. Therefore, in such a case, the risk count is incremented by a maximum value. In the aspect shown in FIG. 2, the maximum value is equal to 100.

Once the risk assessment of blocks 111-17 through 111-29 has completed, the present aspect sets the risk level is set equal to the total of the risk count (X) in block 111-31. The risk level is then output to block 113 of FIG. 1.

According to some embodiments, access attempts to the resource are reenabled after a time duration. The time duration is based on the risk level. The time duration may be different for the second level than for the first level or third level. The amount of allowed reattempts may also vary based on the risk level. For example, a first level risk level may allow for reenablement of credential entry attempts after 30 minutes while a second level risk level may allow reenablement for only one reattempt after 24 hours.

The process shown in FIG. 2 includes the criteria and valuations shown in Table 1, above merely for illustrative purposes. The risk criteria and valuations, as well as the order in which the risk criteria are evaluated in FIG. 2 are not intended to be definitive, but rather are to be taken as a general example from which one of ordinary skill in the art can deviate to suit specific applications of the present disclosure.

The above-described method, as well as other methods encompassed by the present disclosure, can be implemented as a software product operating on one or more computer systems. Additionally, the computer systems executing the method of the present disclosure may be configured to maintain instruction code executable by the computer system for performing the above-described methods in a storage device disposed thereon, such as solid-state storage devices, magnetic media, opti-magnetic media, and optical media. Moreover, the security data may be maintained in a database residing on the computer system, as well.

In some embodiments, the methods of the present disclosure may be executed by one or more first computer systems operable as workstations, while the security data may be stored in dedicated computer systems operating as servers. Likewise, the stream events may be received and processed by a separate server.

Where the implementation of the present disclosure involves multiple computer systems, the individual computer systems can be networked using any of the commonly employed networking protocols, such as TCP/IP, Token Ring, wired Ethernet, and WiFi protocols including 802.11(a), (b), (g) and (n). Additionally, the computer systems may be accessible externally over the Internet.

As will be appreciated by one of skill in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 3:
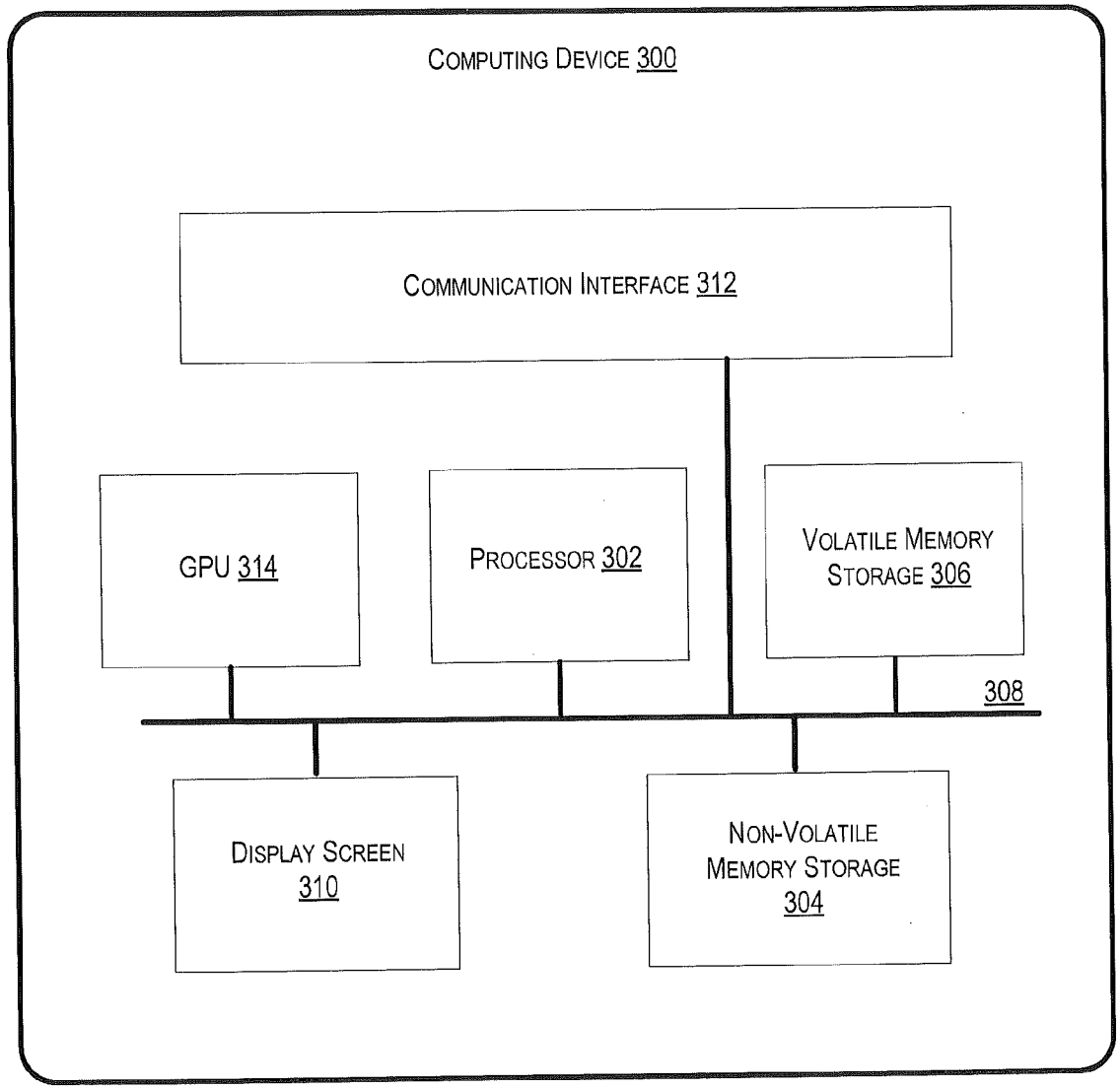
FIG. 3 is a block diagram of a computing device in which embodiments can be implemented.

FIG. 3 is an example computer system 300 in which embodiments of the present disclosure, or portions thereof, may be implemented as computer-readable code. For example, the components and blocks described above may be implemented in one or more computer devices 300 using hardware, software implemented with hardware, firmware, tangible computer-readable storage media having instructions stored thereon, or a combination thereof and may be implemented in one or more computer systems or other processing systems. Components and methods in FIGS. 1-2 may be embodied in any combination of hardware and software.

Computing device 300 may include one or more processors 302, one or more non-volatile storage mediums 304, one or more memory devices 306, a communication infrastructure 308, a display screen 310 and a communication interface 312. Computing device 300 may also have networking or communication controllers, input devices (keyboard, a mouse, touch screen, etc.) and output devices (printer or display).

Processor(s) 302 are configured to execute computer program code from memory devices 304 or 306 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 314 is a specialized processor that executes instructions and programs, selected for complex graphics and mathematical operations, in parallel.

Non-volatile storage 304 may include one or more of a hard disk drive, flash memory, and like devices that may store computer program instructions and data on computer-readable media. One or more of non-volatile storage device 304 may be a removable storage device.

Memory devices 306 may include one or more volatile memory devices such as but not limited to, random access memory. Communication infrastructure 308 may include one or more device interconnection buses such as Ethernet, Peripheral Component Interconnect (PCI), and the like.

Typically, computer instructions are executed using one or more processors 302 and can be stored in non-volatile storage medium 304 or memory devices 306.

Display screen 310 allows results of the computer operations to be displayed to a user or an application developer.

Communication interface 312 allows software and data to be transferred between computer system 300 and external devices. Communication interface 312 may include a modem, a network interface (such as an Ethernet card), a communications port, a PCMCIA slot and card, or the like. Software and data transferred via communication interface 312 may be in the form of signals, which may be electronic, electromagnetic, optical, or other signals capable of being received by communication interface 312. These signals may be provided to communication interface 312 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. An adaptive strike count management method for securing resources, comprising:
   receiving a security credential;
   comparing the security credential with a pre-stored security data securing a resource;
   authorizing access to the resource when the security credential matches the pre-stored security data; and
   when the security credential does not match the pre-stored security data:
   denying access to the resource;
   determining a risk level based on the security credential;
   incrementing a strike counter by a predetermined value based on the risk level; and
   disabling subsequent access attempts to the resource when the strike counter satisfies a threshold,
   wherein incrementing the strike counter further comprises incrementing the strike counter by a first value when the risk level is determined to be a first level and a second value when the risk level is determined to be a second level, wherein the first value is different than the second value, and
   wherein determining the risk level comprises determining the risk level to be the second level when access is attempted from a device different from a device previously used to successfully access the resource.

2. The method of claim 1, wherein determining the risk level further comprises analyzing at least one of a passcode securing the resource, user behavior at previous access occurrences, machine information identifying a machine typically used to access the resource, physical location of typical access occurrences and access frequency.

3. The method of claim 1, wherein determining the risk level comprises determining the risk level to be the first level when the security credential matches a previous security data.

4. The method of claim 1, wherein incrementing the strike counter further comprises incrementing the strike counter by a third value when the risk level is determined to be a third level, the third value being different than the first and second values.

5. The method of claim 4, wherein determining the risk level comprises determining the risk level to be the third level when a latency between multiple unsuccessful access attempts is less than a predetermined latency threshold.

6. The method of claim 4, wherein determining the risk level comprises determining the risk level to be the third level when the access is attempted from a blacklisted location.

7. The method of claim 1, further comprising reenabling access attempts to the resource after a time duration, wherein the time duration is based on the risk level.

8. The method of claim 7, wherein reenabling access attempts further comprises setting the time duration when the risk level is determined to be the second level to be different than the time duration when the risk level is determined to be the first level.

9. A computer program product comprising a non-transitory computer readable storage medium having computer readable program code embodied in the medium, the computer readable program code comprising:
   computer readable program code configured to receive a security credential;
   computer readable program code configured to compare the security credential with a pre-stored security data securing a resource; and
   computer readable program code configured to authorize access to the resource when the security credential matches the pre-stored security data, and
   when the security credential does not match the pre-stored security data:
   deny access to the resource;
   determine a risk level based on the security credential;
   increment a strike counter by a predetermined value based on the risk level; and
   disable subsequent access attempts to the resource when the strike counter satisfies a threshold,
   computer readable program code configured to reenable access attempts to the resource after a time duration, wherein the time duration is based on the risk level.

10. The computer program product of claim 9, further comprising computer readable program code configured to analyze at least one of a passcode securing the resource, user behavior at previous access occurrences, machine information identifying a machine typically used to access the resource, physical location of typical access occurrences and access frequency.

11. The computer program product of claim 9, further comprising computer readable program code configured to increment the strike counter by a first value when the risk level is determined to be a first level and a second value when the risk level is determined to be a second level, the first value being different than the second value.

12. The computer program product of claim 11, wherein the risk level is determined to be the first level when the security credential matches a previous security data.

13. The computer program product of claim 11, wherein the risk level is determined to be the second level when access is attempted from a device different from a device previously used to successfully access the resource.

14. The computer program product of claim 11, further comprising computer readable program code configured to increment the strike counter by a third value when the risk level is determined to be a third level, the third value being different than the first and second values.

15. The computer program product of claim 14, wherein the risk level is determined to be the third level when a latency between multiple unsuccessful access attempts is less than a predetermined latency threshold.

16. The computer program product of claim 14, wherein the risk level is determined to be the third level when the access is attempted from a blacklisted location.

17. The computer program product of claim 9, further comprising computer readable program code configured to set the time duration when the risk level is determined to be the second level to be different than the time duration when the risk level is determined to be the first level.

* * * * *